United States Patent
Wolk

[11] 3,762,473
[45] Oct. 2, 1973

[54] WELL INSTRUMENT POSITIONING DEVICE

[75] Inventor: Piero Wolk, Houston, Tex.
[73] Assignee: Dresser Industries, Inc., Dallas, Tex.
[22] Filed: July 25, 1972
[21] Appl. No.: 274,939

[52] U.S. Cl. .............................. 166/241, 175/4.52
[51] Int. Cl. ...................... E21b 17/10, E21b 23/00
[58] Field of Search.................. 166/100, 55.1, 55.2, 166/241; 175/4.51, 4.52, 4.53, 4.56

[56] References Cited
UNITED STATES PATENTS

| | | | |
|---|---|---|---|
| 1,898,074 | 2/1933 | Bailey | 166/241 UX |
| 3,555,689 | 1/1971 | Cubberly | 166/241 X |
| 3,064,571 | 11/1962 | True | 166/55.1 X |
| 3,087,552 | 4/1963 | Graham | 166/241 X |
| 3,092,182 | 6/1963 | Blagg | 166/241 |
| 3,550,695 | 12/1970 | Shore | 175/4.56 X |
| 3,707,195 | 12/1972 | Lanmon | 166/100 X |

Primary Examiner—David H. Brown
Attorney—Robert W. Mayer et al.

[57] ABSTRACT

An apparatus is provided for positioning a well instrument in a well in the proper position for a well operation. An annular movable element is positioned encircling the well instrument housing. A movable arm is connected to the well instrument housing by a pivot that allows the movable arm to turn relative to said instrument housing. One end of the movable arm is linked to the annular movable element so that said end of the movable arm moves with the annular movable element. A spring encircles the well instrument housing and is connected between the well instrument housing and the annular movable element. A release element allows the force of the spring to move the annular movable element causing the movable arm to pivot and thereby extend the other end of the movable arm until it contacts the wall of the well and places the well instrument in the proper position for the desired well operation.

11 Claims, 3 Drawing Figures

PATENTED OCT 2 1973 3,762,473

WELL INSTRUMENT POSITIONING DEVICE

BACKGROUND OF THE INVENTION

The present invention relates to the art of petroleum exploration and production and, more particularly, to an apparatus for positioning a well instrument in a well.

Many well instruments must be properly oriented in a well before being actuated to perform the desired operation in the well. For example, a perforating apparatus such as that shown in U. S. Pat. No. 3,589,453 to A. A. Venghiattes patented June 29, 1971 operates best if the instrument is centered in the well. On the other hand, a perforating apparatus such as that shown in U. S. Pat. No. 3,620,314 to F. O. Bohn patented Nov. 16, 1971 operates sufficiently if it is positioned against one wall of the well. Logging instruments such as the logging instrument shown in U. S. Pat. No. 3,321,627 to C. W. Tittle patented May 23, 1967 require proper orientation in the well during the logging operation.

Most of the prior art positioning devices are large and take up more of the length of the well instrument than is desirable. In addition, many of the prior art positioning devices are larger in diameter than is desirable. The provision of a small and compact positioning device will allow the space within the well instrument to be used with greater efficiency and economy and will allow the well instrument to operate more efficiently and under a wider variety of conditions.

In many instances a well instrument positioning device must be adapted to be controlled by purely mechanical elements because any attempt to transmit current along the logging cable that controls the well instrument results in the possiblity of the current accidentally actuating systems within the well instrument or in other ways interfering with the operation of the well instrument. For example, in the case of a perforator, the use of an electric current to control the positioning device includes a substantial risk because the current could accidentally detonate the perforator charges.

DESCRIPTION OF THE PRIOR ART

In U. S. Pat. No. 2,832,421 to R. C. Baker patented Apr. 29, 1958, a centering apparatus for well bore conduits is shown. The apparatus includes a tubular body adapted to form a part of a conduit string, a plurality of leaf springs disposed in circumferentially spaced relation around the exterior of said body and means for confining the ends of th leaf springs proximate said body.

In U. S. Pat. No. 2,652,118 to W. W. Hartman et al patented Sept. 15, 1953, a basket guide is shown. The basket guide includes upper and lower collars spaced substantially apart from each other and adapted to embrace and slide along the pipe with outwardly bowed springs fastened to said upper and lower collars to form a guide.

In U. S. Pat. No. 2,231,767 to A. J. Mason, Jr. patented Feb. 11, 1941, an open hole support is shown. The support includes a leg pivotally mounted on the housing and link means for swinging the leg into a position where its outer end engages the wall of the hole to support the housing. The outer end of the leg presents a substantial area engaging the bore wall and holding the element against downward movement.

In U. S. Pat. No. 3,620,314 to F. O. Bohn patented Nov. 16, 1971, a combination bullet perforating gun and shaped charge perforator is shown. The perforator includes a centralizer means for contacting the wall of the well and placing the perforator in the proper position for operation.

SUMMARY OF THE INVENTION

The present invention provides an apparatus for positioning a well instrument in a well. A movable element is positioned on the well instrument. A movable arm is connected to the well instrument by a pivot means that allows the movable arm to turn relative to the well instrument. A linking means links one end of the movable arm with the movable element so that said end of said arm moves with said movable element. A force means is provided for applying a force to the movable element and a release means is provided for selectively connecting and disconnecting the movable element to the well instrument.

The above and other features and advantages of the present invention will become apparent from a consideration of the following detailed description of the invention when taken in conjunction with the drawings.

DETAILED DESCRIPTION OF THE INVENTION

Figure 1:
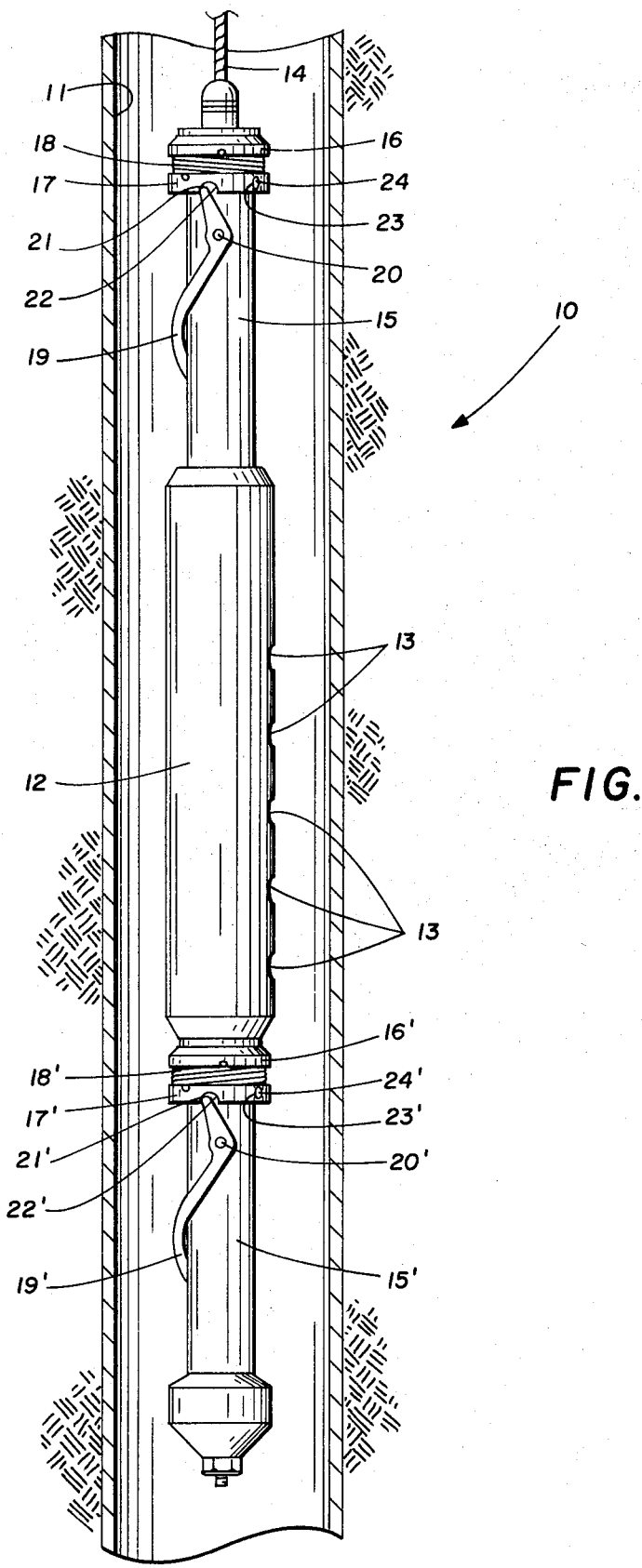
FIG. 1 illustrates a well instrument constructed in accordance with the present invention positioned in a well.

Referring now to FIG. 1, a well instrument generally designated by the reference numeral 10 is illustrated positioned in a well 11. The well 11 may be cased, uncased, may contain one or more strings of tubing or may in general be any type of borehole. The well instrument 10 includes an operating section 12. The operating section 12 in the embodiment shown includes a multiplicity of individual operating units 13. The operating units 13 are perforators adapted to be selectively fired through a casing or tubing within well 11. It is to be understood that other operating units such as a sidewall sampling unit similar to that shown in U. S. Pat. No. 3,272,268 to A. J. Tricon et al patented Sept. 13, 1969 could be used in place of the perforator operating units 13. It will be appreciated that this type of operating units is preferably positioned against the wall of the well 11 during the operating cycle.

The well instrument 10 is lowered into the well 11 by a cable 14. The cable 14 contains an electrical conductor for transmitting current to selectively detonate the perforator guns 13. It will be appreciated that an apparatus for positioning the well instrument 10 should be operated by purely mechanical systems since the transmission of a current down the cable 14 for operating the positioning system would present a substantial danger of detonation of the perforator guns 13. It can also be appreciated that the positioning system should be simple, reliable and take up a minimum amount of space along the body of the well instrument 10.

The well instrument 10 includes sections 15 and 15ʹ that form a portion of the body of the well instrument. A fixed ring 16 is firmly secured to section 15 and a fixed ring 16ʹ is firmly secured to the section 15ʹ. A rotating ring 17 is positioned to encircle the outside of the section 15 and a rotating ring 17f is positioned to encircle the outside of the section 15'. A torque spring 18 encircles the section 15 and has one end connected to the fixed ring 16 and the other end connected to the rotating ring 17. A torque spring 18' encircles the section 15' and has one end connected to the fixed ring 16' and the other end connected to the rotating ring 17'. A centralizing arm 19 is connected to the section 15 at a pivot point by a pin 20. The upper end 21 of the arm 19 fits within a notch 22 in the rotating ring 17. A hole 23 extends through the rotating ring 17 and is adapted to receive a lock pin 24. A centralizing arm 19' is connected to the section 15' at a pivot point by a pin 20'. The upper end 21' of the arm 19' fits within a notch 22' in the rotating ring 17'. A hole 23' extends through the rotating ring 17' and is adapted to receive a lock pin 24'.

Figure 2:
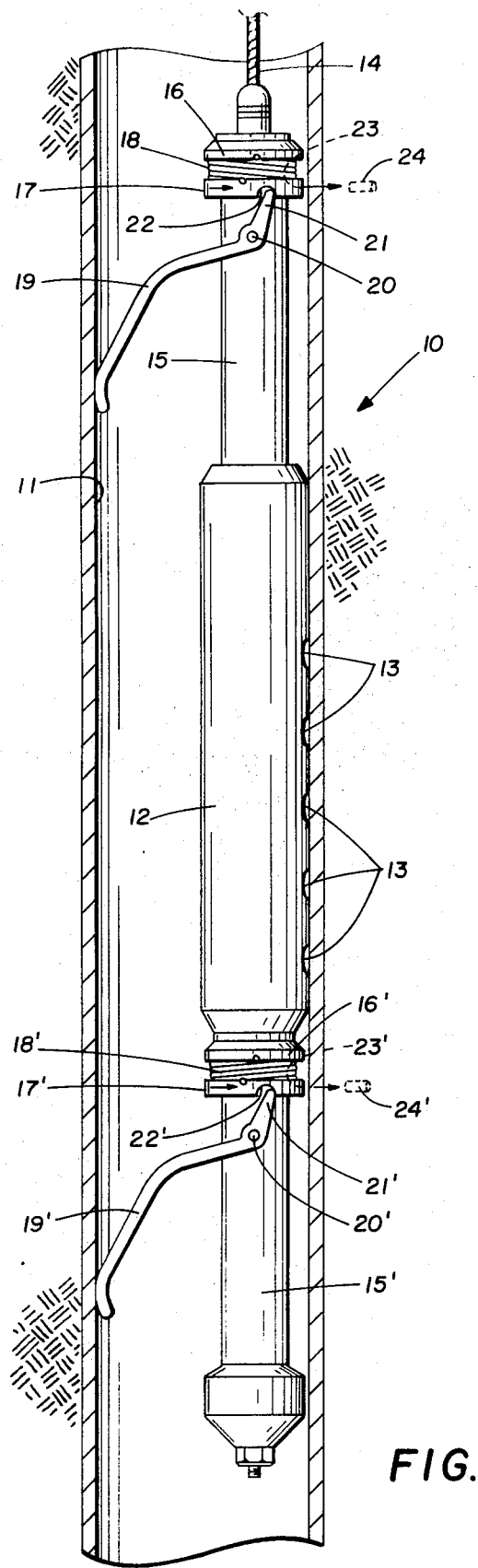
FIG. 2 shows the well instrument of FIG. 1 positioned for operation.

The structural details of an apparatus constructed in accordance with the present invention having been described, the operation of the apparatus will now be considered with reference to FIG. 2. The well instrument 10 is lowered into well 11 by cable 14. The centralizing arms 19 and 19', rotating rings 17 and 17' and springs 18 and 18' are in the position shown in FIG. 1 with the arms 19 and 19' next to the sections 15 and 15'. When the well instrument 10 reaches the depth in the well wherein a perforation is desired, it becomes necessary to move the operating section 12 against the wall of the well 11. This is easily accomplished by removing the lock pins 24 and 24'. The lock pins may be constructed of a material such as a plug of salt that will dissolve gradually when exposed to fluid in the well bore or a plug of dry ice that will melt. With the lock pins 24 and 24' removed, the rotating rings 17 and 17' are moved by force from the torque springs 18 and 18'. As the rotating rings 17 and 17' turn, the upper ends 21 and 21' of the centralizing arms 19 and 19' are also moved since they fit within the notches 22 and 22' in the rotating rings 17 and 17'. This causes the centralizing arms 19 and 19' to rotate on pins 20 and 20' and turn about the pivot point. The lower ends 25 and 25' of centralizing arms 19 and 19' contact the wall of the well 11 and move the operating section 12 proximate the wall of the well 11. Current is transmitted down the cable 14 to detonate one or more of the perforating guns 13. The well instrument 10 may easily be withdrawn from the well because the arms 19 and 19' can move in and out to accommodate any constrictions in the well 11.

Figure 3:
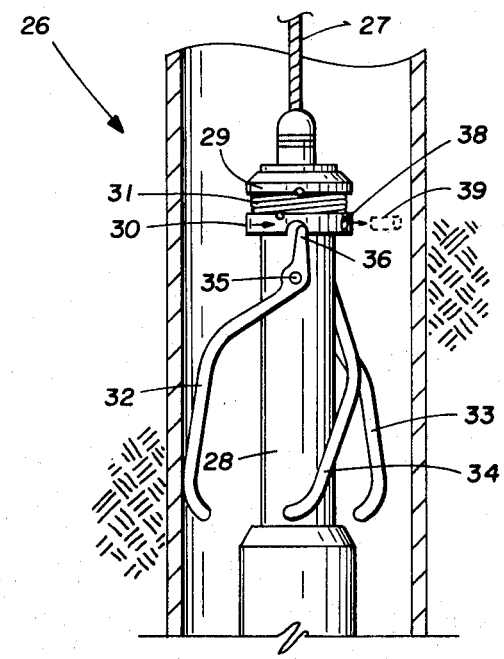
FIG. 3 illustrates another embodiment of the present invention.

Referring now to FIG. 3, another embodiment of a well instrument positioning apparatus of the present invention is shown. The well instrument positioning apparatus is mounted upon the upper portion of a well instrument designated by the reference numeral 26. The well instrument 26 is adapted to be suspended in a well or borehole (not shown) by a cable 27. The lower portion of the well instrument 26 consists of an operating section 28. This operating section 28 may include perforators, logging instruments or other well operating systems.

A fixed ring 29 is firmly secured to the upper portion of the well instrument 26. A rotating ring 30 is positioned below the fixed ring 29 and adapted to encircle the well instrument 26. A torque spring 31 encircles the well instrument 26 and is located between the fixed ring 29 and the rotating ring 30. The torque spring 31 has one end connected to the fixed ring 29 and the other end connected to the rotating ring 30. Three individual, centralizing arms 32, 33 and 34 are connected to the well instrument 26 at three individual rotating points. A pin connects each of the arms to the well instrument 26 with one of the pins 35 being shown in FIG. 3. The upper end of each of the arms 32, 33 and 34 fits within a notch in the rotating ring 30. The upper end 36 of arm 32 is shown positioned within a notch 37 in rotating ring 30. A hole 38 extends through the rotating ring 30 and is adapted to receive a lock pin 39.

In operation, the well instrument 26 is lowered into a well (not shown) by the cable 27 until it reaches a location in the well wherein the desired well operation is to be performed. The lock pin 39 is removed and the arms allowed to move to their open position as shown in FIG. 3. This may be accomplished by the lock pin 39 being constructed from material that will dissolve or melt when exposed to the well fluids. The lock pin 39 is inserted in the hole 38 holding the arms in the closed position until the well instrument 26 is in the desired position for operation. The well instrument 26 is allowed to remain in that position for a period of time until the lock pin 39 dissolves allowing the force of spring 31 to rotate rotating ring 30 and move arms 32, 33 and 34 to their extended position. In some instances, it may be desirable to remove the lock pin 39 at the surface before the well instrument is inserted into the well. The arms 32, 33 and 34 will slide along the wall of the well until the well instrument reaches the depth wherein the well operation is to be performed. The arms 32, 33 and 34 will retain the well instrument in a centralized position throughout the well operation.

The embodiments of the invention in which an exclusive property or privilege is claimed are defined as follows:

1. An apparatus for positioning a well instrument in a well, comprising:
   a movable element positioned on said well instrument, said movable element substantially encircling said well instrument;
   a movable arm positioned on said well instrument;
   means for linking one end of said movable arm with said movable element so that said end of said arm is adapted to move with said movable element; and
   force means for rotating said movable element relative to said well instrument.

2. The apparatus of claim 1 wherein said force means is a spring that substantially encircles said well instrument with one end of said spring connected to said movable element and the other end of said spring connected to said well instrument.

3. The apparatus of claim 2 including at least one additional movable arm positioned on said well instrument and linking means for linking one end of said additional movable arm with said movable element so that said end of said arm is adapted to move with said movable element.

4. An apparatus for positioning a well instrument in a well, comprising:
   a movable element positioned on said well instrument, said movable element substantially encircling said well instrument;
   a movable arm positioned on said well instrument;
   means for linking one end of said movable arm with said movable element so that said end of said arm is adapted to move with said movable element;
   at least one additional movable arm positioned on said well instrument and linking means for linking one end of said additional movable arm with said movable element so that said end of said arm is adapted to move with said movable element;

force means for applying a force to said movable element, said force means being a spring that substantially encircles said well instrument with one end of said spring connected to said movable element and the other end of said spring connected to said well instrument; and release means for selectively connecting and disconnecting said movable element to said well instrument.

5. The apparatus of claim 4 wherein said release means is a pin constructed of a material that will dissipate when exposed to the environmental conditions within the well.

6. The apparatus of claim 5 wherein said pin is constructed of salt.

7. The apparatus of claim 5 wherein said pin is constructed of dry ice.

8. An apparatus for positioning a well instrument in a well, comprising:

a movable element positioned around said well instrument, said movable element substantially encircles said well instrument;

a movable arm;

pivot means for rotatably connecting said movable arm to said well instrument;

linking means for linking one end of said movable arm with said movable element so that said end of said arm is adapted to move with said movable element; and force means for rotating said movable element relative to said well instrument.

9. The apparatus of claim 8 wherein said force means is a spring that substantially encircles said well instrument with one end of said spring connected to said movable element and the other end of said spring connected to said well instrument.

10. The apparatus of claim 8 including at least one additional movable arm, at least one additional pivot means for rotatably connecting said additional movable arm to said well instrument and at least one additional linking means for linking one end of said additional movable arm with said movable element so that said end of said arm is adapted to move with said movable element.

11. An apparatus for positioning a well instrument in a well, comprising:

a movable element positioned around said well instrument, said movable element substantially encircling said well instrument;

a movable arm;

pivot means for rotatably connecting said movable arm to said well instrument;

linking means for linking one end of said movable arm with said movable element so that said end of said arm is adapted to move with said movable element;

force means for applying a force to said movable element, said force means being a spring that substantially encircles said well instrument with one end of said spring connected to said movable element and the other end of said spring connected to said well instrument; and release means for selectively connecting and disconnecting said movable element to said well instrument.

* * * * *